(12) United States Patent
Cudak et al.

(10) Patent No.: US 9,256,539 B2
(45) Date of Patent: *Feb. 9, 2016

(54) SHARING CACHE IN A COMPUTING SYSTEM

(71) Applicant: LENOVO ENTERPRISE SOLUTIONS (SINGAPORE) PTE. LTD., Singapore (SG)

(72) Inventors: Gary D. Cudak, Creedmoor, NC (US); Lydia M. Do, Raleigh, NC (US); Christopher J. Hardee, Raleigh, NC (US); Adam Roberts, Moncure, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 199 days.

This patent is subject to a terminal disclaimer.

(21) Appl. No.: 13/789,063

(22) Filed: Mar. 7, 2013

(65) Prior Publication Data
US 2014/0258632 A1 Sep. 11, 2014

(51) Int. Cl.
G06F 12/00 (2006.01)
G06F 12/08 (2006.01)
G06F 3/06 (2006.01)
G06F 9/50 (2006.01)

(52) U.S. Cl.
CPC ............ *G06F 12/084* (2013.01); *G06F 3/0644* (2013.01); *G06F 9/50* (2013.01); *G06F 12/0813* (2013.01)

(58) Field of Classification Search
CPC .. G06F 12/084; G06F 12/0813; G06F 3/0644
See application file for complete search history.

(56) References Cited

U.S. PATENT DOCUMENTS

| 5,860,131 A | 1/1999 | Daub |
| 6,442,661 B1 | 8/2002 | Dreszer |

(Continued)

FOREIGN PATENT DOCUMENTS

| JP | 2003323370 A | 11/2003 |
| JP | 2007148554 A | 6/2007 |
| JP | 2010128831 A | 6/2010 |
| WO | WO02054250 A2 | 11/2002 |

OTHER PUBLICATIONS

IBM; "Method and System to Support Multiple Caching Solutions in Java/J2EE Applications Based of a Consumer Model of the Application", IP.com Prior Art Database, Apr. 22, 2009, pp. 1-19, IP.com No. IPCOM000181995D.

(Continued)

*Primary Examiner* — Yong Choe
*Assistant Examiner* — Alan Otto
(74) *Attorney, Agent, or Firm* — Edward J. Lenart; Katherine S. Brown; Kennedy Lenart Spraggins LLP

(57) ABSTRACT

Sharing cache in a computing system that includes a plurality of enclosure attached servers, including: identifying, by an enclosure, a first enclosure attached server that is not meeting a first predetermined performance threshold; identifying, by the enclosure, a second enclosure attached server that is meeting a second predetermined performance threshold; blocking, by the enclosure, access to a predetermined amount of cache on the second enclosure attached server by the second enclosure attached server; determining, by the enclosure, whether the second enclosure attached server is meeting the second predetermined performance threshold; responsive to determining that the second enclosure attached server is meeting the second predetermined performance threshold, lending, by the enclosure, the predetermined amount of cache on the second enclosure attached server to the first enclosure attached server.

17 Claims, 3 Drawing Sheets

(56) References Cited

U.S. PATENT DOCUMENTS

| | | |
|---|---|---|
| 6,584,547 B2 | 6/2003 | Palanca et al. |
| 7,577,800 B2 | 8/2009 | Carlson et al. |
| 2002/0046323 A1 | 4/2002 | Kawano |
| 2006/0117139 A1 | 6/2006 | Kobayashi et al. |
| 2008/0010409 A1* | 1/2008 | Rao et al. ............. 711/118 |
| 2008/0244181 A1* | 10/2008 | Walz et al. ............. 711/121 |
| 2010/0131720 A1 | 5/2010 | Harper, III et al. |
| 2012/0254531 A1 | 10/2012 | Urata et al. |

OTHER PUBLICATIONS

Chang et al; "Cooperative Caching for Chip Multiprocessors", 33rd International Symposium on Computer Architecture 2006 (ISCA'06), Jun. 2006, pp. 264-276, IEEE.org, DOI: 10.1109/ISCA.2006.17.

* cited by examiner

SHARING CACHE IN A COMPUTING SYSTEM

BACKGROUND OF THE INVENTION

1. Field of the Invention

The field of the invention is data processing, or, more specifically, methods, apparatus, and products for sharing cache in a computing system.

2. Description of Related Art

Modern computing systems include various types of computer memory, each of which has differing access times. In order to make use of quick access memory, many computing systems implement a cache which ideally contains the most frequently accessed data. In a cached environment, direct attached cache provides the best performance with respect to latency. Non-volatile memory can be used in this space for the cache and is less expensive than DRAM, but is still expensive enough so that over provisioning the direct attached cache to cover all possible workloads and all hotspot sizes is not economical.

SUMMARY OF THE INVENTION

Methods, apparatuses, and products for sharing cache in a computing system that includes a plurality of enclosure attached servers, including: identifying, by an enclosure, a first enclosure attached server that is not meeting a first predetermined performance threshold; identifying, by the enclosure, a second enclosure attached server that is meeting a second predetermined performance threshold; blocking, by the enclosure, access to a predetermined amount of cache on the second enclosure attached server by the second enclosure attached server; determining, by the enclosure, whether the second enclosure attached server is meeting the second predetermined performance threshold; and responsive to determining that the second enclosure attached server is meeting the second predetermined performance threshold, lending, by the enclosure, the predetermined amount of cache on the second enclosure attached server to the first enclosure attached server.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
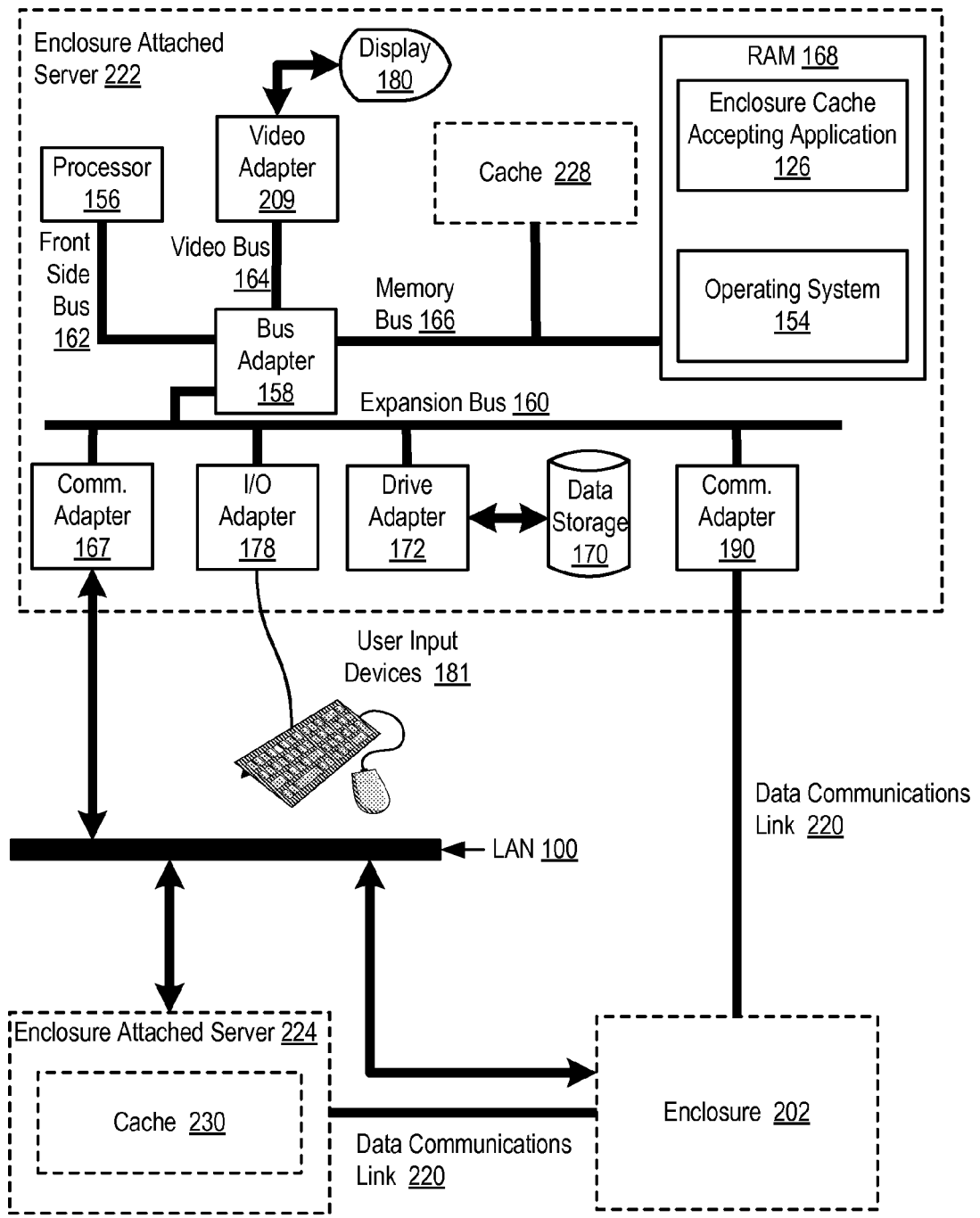
FIG. 1 sets forth a block diagram of a computing system for sharing cache amongst a plurality of enclosure attached servers according to embodiments of the present invention.

Example methods, apparatus, and products for sharing cache in a computing system that includes a plurality of enclosure attached servers in accordance with the present invention are described with reference to the accompanying drawings, beginning with FIG. 1. FIG. 1 sets forth a block diagram of a computing system for sharing cache amongst a plurality of enclosure attached servers (222, 224) according to embodiments of the present invention.

The example of FIG. 1 includes an enclosure (202). The enclosure (202) may be embodied as a structure in a blade center that includes memory resources for use by servers that are coupled for data communications with the enclosure (202). The enclosure (202) may include hard disk drives ('HDDs'), solid-state drives ('SSDs'), flash memory, and other forms of computer memory as will occur to those of skill in the art. The enclosure (202) may also include enclosure cache that is embodied as relatively fast access memory such as flash memory. Readers will appreciate that the enclosure (202) may also include a network adapter for receiving data communications from other computers in the blade center, memory adapters for receiving memory access requests from other computers in the blade center, and so on.

The enclosure (202) of FIG. 1 may also include computer logic that includes computer program instructions executed by computer hardware. The computer logic contained in the enclosure (202) may also include computer memory. The computer logic contained in the enclosure (202) may be embodied, for example, as a combination of one or more computing elements including a field-programmable gate array ('FPGA'), application specific integrated circuit ('ASIC'), a computer processor, computer memory, and so on. The computer logic contained in the enclosure (202) may be configured to carry out the steps described below. The example computing system of FIG. 1 includes a plurality of enclosure attached servers (222, 224). The enclosure attached servers (222, 224) of FIG. 1 may be embodied, for example, as blade servers mounted in a blade center. The enclosure attached servers (222, 224) of FIG. 1 may include computer processors, computer memory, data communications adapters, and other computing hardware such that the enclosure attached servers (222, 224) operate as a fully functional computer that can run one or more services. The enclosure attached servers (222, 224) of FIG. 1 also include local server cache (228, 230). The local server cache (228, 230) of FIG. 1 may be embodied as relatively fast access memory, such as flash memory, that resides within an enclosure attached server (222, 224). The enclosure cache and the local server cache (228, 230) may be embodied as identical types of computer memory that are addressed identically and provide similar access times. Readers will appreciate that although each enclosure attached server (222, 224) depicted in FIG. 1 includes local server cache (228, 230), the computing system may also include enclosure attached servers that do not include local server cache.

The enclosure attached servers (222, 224) of FIG. 1 are coupled for data communications with the enclosure (202) over a data communications link (220). The data communications link (220) may be embodied, for example, as an Ethernet link, a Fibre Channel link, an InfiniBand link, or any other data communications link that enables each of the enclosure attached servers (222, 224) to communicate with the enclosure (202). Alternatively, the data communications link (220) may also be embodied as a computer bus such as a Small Computer System Interface ('SCSI') bus, Serial Attached SCSI ('SAS') bus, Serial ATA ('SATA') bus, Universal Serial Bus ('USB'), or other computer bus that can be utilized by enclosure attached servers (222, 224) and the enclosure (202) to perform memory access operations in which the enclosure attached servers (222, 224) access memory contained in the enclosure (202).

The enclosure (202) of FIG. 1 can carry out sharing cache in a computing system that includes a plurality of enclosure attached servers (222, 224) by identifying a first enclosure attached server (222) that is not meeting a first predetermined performance threshold. The first predetermined performance threshold may include information specifying a number of requests to service in a predetermined period of time, an average response time for performing various operations, and so on. Identifying a first enclosure attached server (222) that is not meeting a first predetermined performance threshold may be carried out, for example, by the enclosure (202) querying each enclosure attached server (222, 224) for performance information, receiving such performance information from each enclosure attached server (222, 224), and comparing the performance information from each enclosure attached server (222, 224) to predetermined performance thresholds for enclosure attached server (222, 224). If a particular enclosure attached server (222, 224) is not meeting its predetermined performance threshold, the enclosure attached server (222, 224) may be identified as an enclosure attached server (222, 224) that is not meeting its predetermined performance threshold. In the example depicted in FIG. 1, assume that enclosure attached server (222) has been identified as being a first enclosure attached server (222) that is not meeting a first predetermined performance threshold.

The enclosure (202) of FIG. 1 can further carry out sharing cache in a computing system that includes a plurality of enclosure attached servers (222, 224) by identifying a second enclosure attached server (224) that is meeting a second predetermined performance threshold. The second predetermined performance threshold may include information specifying a number of requests to service in a predetermined period of time, an average response time for performing various operations, and so on. Identifying a second enclosure attached server (224) that is meeting a second predetermined performance threshold may be carried out, for example, by the enclosure (202) querying each enclosure attached server (222, 224) for performance information, receiving such performance information from each enclosure attached server (222, 224), and comparing the performance information from each enclosure attached server (222, 224) to predetermined performance thresholds for enclosure attached server (222, 224). If a particular enclosure attached server (222, 224) is meeting its predetermined performance threshold, the enclosure attached server (222, 224) may be identified as an enclosure attached server (222, 224) that is meeting its predetermined performance threshold. In the example depicted in FIG. 1, assume that enclosure attached server (224) has been identified as being a second enclosure attached server (224) that is meeting a second predetermined performance threshold.

The enclosure (202) of FIG. 1 can further carry out sharing cache in a computing system that includes a plurality of enclosure attached servers (222, 224) by blocking access to a predetermined amount of cache (230) on the second enclosure attached server (224) by the second enclosure attached server (224). The predetermined amount of cache (230) on the second enclosure attached server (224) may be specified as a predetermined percentage of the entire cache (230) on the second enclosure attached server (224), as a predetermined amount of memory, and so on. Blocking access to a predetermined amount of cache (230) on the second enclosure attached server (224) may be carried out, for example, by the enclosure (202) sending an instruction to the second enclosure attached server (224) that identifies a portion of the cache (230) on the second enclosure attached server (224) that the second enclosure attached server (224) should avoid utilizing. In such an example, the second enclosure attached server (224) can effectively set aside a portion of its cache (230) for possible use by the first enclosure attached server (222) that is not meeting a first predetermined performance threshold. Prior to actually allowing the first enclosure attached server (222) to utilize the predetermined amount of cache (230) on the second enclosure attached server (224), however, the enclosure (202) can block the second enclosure attached server (224) from accessing the predetermined amount of cache (230) on the second enclosure attached server (224) to determine the performance impact to the second enclosure attached server (224).

The enclosure (202) of FIG. 1 can further carry out sharing cache in a computing system that includes a plurality of enclosure attached servers (222, 224) by determining whether the second enclosure attached server (224) is meeting the second predetermined performance threshold. Determining whether the second enclosure attached server (224) is meeting the second predetermined performance threshold may be carried out after access to the predetermined amount of cache (230) on the second enclosure attached server (224) has been blocked. In such a way, the performance impact associated with reducing the size of the cache (230) that may be utilized by the second enclosure attached server (224) can be determined before actually lending some portion of the cache (230) on the second enclosure attached server (224) to another enclosure attached server (222).

Determining whether the second enclosure attached server (224) is meeting the second predetermined performance threshold may be carried out, for example, by the enclosure (202) querying the second enclosure attached server (224) for performance information, receiving such performance information from the second enclosure attached server (224), and comparing the performance information to the second predetermined performance threshold. If the second enclosure attached server (224) is still meeting the second predetermined performance threshold after access to the predetermined amount of cache (230) has been blocked, the second enclosure attached server (224) can safely lend the predetermined amount of cache (230) to another enclosure attached server (222) and still meet its performance requirements. If the second enclosure attached server (224) is not meeting the second predetermined performance threshold after access to the predetermined amount of cache (230) has been blocked, however, the second enclosure attached server (224) cannot lend the predetermined amount of cache (230) to another enclosure attached server (222) and still meet its performance requirements.

The enclosure (202) of FIG. 1 can further carry out sharing cache in a computing system that includes a plurality of enclosure attached servers (222, 224) by lending the predetermined amount of cache (230) on the second enclosure attached server (224) to the first enclosure attached server (222). Lending the predetermined amount of cache (230) on the second enclosure attached server (224) to the first enclosure attached server (222) is carried out in response to affirmatively determining that the second enclosure attached server (224) that is meeting the second predetermined performance threshold. The enclosure (202) lends the predetermined amount of cache (230) on the second enclosure attached server (224) to the first enclosure attached server (222) in the sense that the first enclosure attached server (222) will access the predetermined amount of cache (230) on the second enclosure attached server (224) through the enclosure (202)—not through direct communication with the second enclosure attached server (224).

The enclosure (202) can lend the predetermined amount of cache (230) on the second enclosure attached server (224) to the first enclosure attached server (222), for example, by servicing memory access requests initiated by the first enclosure attached server (222) that do not result in a cache hit on local cache in the first enclosure attached server (222). Processing logic such as a computer processor within the first enclosure attached server (222) may generate a request to access computer memory. The first enclosure attached server (222) may initially attempt to service the request to access computer memory by searching any local cache (228) that is included in the first enclosure attached server (222). If the request to access computer memory cannot be serviced using cache (228) that is included in the first enclosure attached server (222), the first enclosure attached server (222) can send the request to access computer memory to the enclosure (202) over the data communications link (220).

Upon receipt of the request to access computer memory, the enclosure (202) may forward the request to a cache controller that resides on the second enclosure attached server (224). The cache controller may subsequently determine whether the request can be serviced using the predetermined amount of cache (230) on the second enclosure attached server (224) that has been lent to the first enclosure attached server (222). The cache controller can manage the predetermined amount of cache (230) on the second enclosure attached server (224) as if it were its own distinct cache, including replacing entries in the predetermined amount of cache (230) on the second enclosure attached server (224) according to a predetermined replacement policy. In such a way, the predetermined amount of cache (230) on the second enclosure attached server (224) can be utilized by the first enclosure attached server (222) as if it were local cache on the first enclosure attached server (222).

The first enclosure attached server (222), the second enclosure attached server (224), and the enclosure (202) may each be embodied as computing devices of varying complexity. The first enclosure attached server (222) is illustrated in greater detail. The first enclosure attached server (222) of FIG. 1 includes at least one computer processor (156) or 'CPU' as well as random access memory (168) (RAM') which is connected through a high speed memory bus (166) and bus adapter (158) to processor (156) and to other components of the first enclosure attached server (222). Stored in RAM (168) is an enclosure cache accepting application (126), a module of computer program instructions useful for receiving and utilizing cache that is lent to the first enclosure attached server (222) by the second enclosure attached server (224).

Also stored in RAM (168) is an operating system (154). Operating systems useful in sharing cache in a computing system that includes a plurality of enclosure attached servers (222, 224) according to embodiments of the present invention include UNIX™ Linux™ Microsoft XP™, AIX™, IBM's i5/OS™ and others as will occur to those of skill in the art. The operating system (154) and the cache accepting application (126) in the example of FIG. 1 are shown in RAM (168), but many components of such software typically are stored in non-volatile memory also, such as, for example, on a disk drive (170).

The first enclosure attached server (222) of FIG. 1 includes disk drive adapter (172) coupled through expansion bus (160) and bus adapter (158) to processor (156) and other components of the first enclosure attached server (222). Disk drive adapter (172) connects non-volatile data storage to the first enclosure attached server (222) in the form of disk drive (170). Disk drive adapters useful in sharing cache in a computing system that includes a plurality of enclosure attached servers (222, 224) according to embodiments of the present invention include Integrated Drive Electronics ('IDE') adapters, SCSI adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example first enclosure attached server (222) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example first enclosure attached server (222) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example first enclosure attached server (222) of FIG. 1 includes a communications adapter (167) for data communications with other computers such as the second enclosure attached server (224), the enclosure (202), and for data communications with a data communications network (100). Such data communications may be carried out serially through RS-232 connections, through external buses such as a USB, through data communications networks such as IP data communications networks, and in other ways as will occur to those of skill in the art. Communications adapters implement the hardware level of data communications through which one computer sends data communications to another computer, directly or through a data communications network. Examples of communications adapters useful for sharing cache in a computing system that includes a plurality of enclosure attached servers (222, 224) according to embodiments of the present invention include modems for wired dial-up communications, Ethernet (IEEE 802.3) adapters for wired data communications network communications, and 802.11 adapters for wireless data communications network communications.

Figure 2:
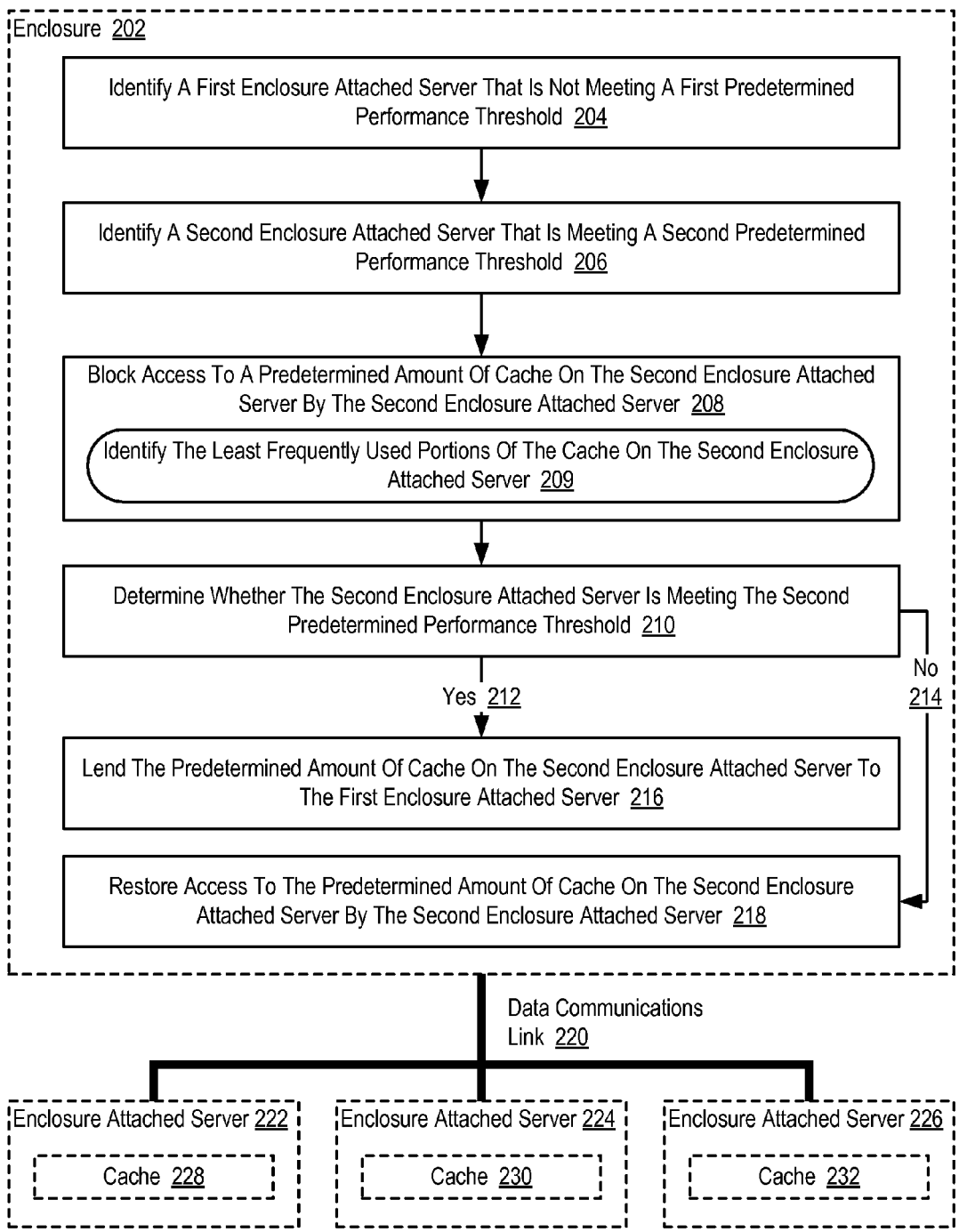
FIG. 2 sets forth a flow chart illustrating an example method for sharing cache in a computing system that includes a plurality of enclosure attached servers according to embodiments of the present invention.

For further explanation, FIG. 2 sets forth a flow chart illustrating an example method for sharing cache in a computing system that includes a plurality of enclosure attached servers (222, 224, 226) according to embodiments of the present invention. The example method of FIG. 2 is carried out to a large extent by an enclosure (202). In the example method of FIG. 2, an enclosure (202) is a structure in a blade center that includes memory resources for use by servers that are coupled for data communications with the enclosure (202). The enclosure (202) may include hard disk drives ('HDDs'), solid-state drives ('SSDs'), flash memory, and other forms of computer memory as will occur to those of skill in the art. The enclosure (202) may also include enclosure cache that is embodied as relatively fast access memory such as flash memory. Readers will appreciate that the enclosure (202) may also include a network adapter for receiving data communications from other computers in the blade center, memory adapters for receiving memory access requests from other computers in the blade center, and so on.

The example method of FIG. 2 is carried out in a computing system that includes a plurality of enclosure attached servers (222, 224, 226). The enclosure attached servers (222, 224,

226) of FIG. 2 may be embodied, for example, as blade servers mounted in a blade center. The enclosure attached servers (222, 224, 226) of FIG. 2 may include computer processors, computer memory, data communications adapters, and other computing hardware such that the enclosure attached servers (222, 224, 226) operate as a fully functional computer that can run one or more services. The enclosure attached servers (222, 224, 226) of FIG. 2 also include local server cache (228, 230, 232). The local server cache (228, 230, 232) of FIG. 2 may be embodied as relatively fast access memory, such as flash memory, that resides within an enclosure attached server (222, 224, 226). In the example method of FIG. 2, the enclosure cache and the local server cache (228, 230, 232) may be embodied as identical types of computer memory that are addressed identically and provide similar access times. Readers will appreciate that although each enclosure attached server (222, 224, 226) depicted in FIG. 2 includes local server cache (228, 230, 232), the computing system may also include enclosure attached servers that do not include local server cache.

In the example method of FIG. 2, the enclosure attached servers (222, 224, 226) are coupled for data communications with the enclosure (202) over a data communications link (220). In the example method of FIG. 2, the data communications link (220) may be embodied, for example, as an Ethernet link, a Fibre Channel link, an InfiniBand link, or any other data communications link that enables each of the enclosure attached servers (222, 224, 226) to communicate with the enclosure (202). Alternatively, the data communications link (220) may also be embodied as a computer bus such as a SCSI bus, SAS bus, SATA bus, USB, or other computer bus that can be utilized by enclosure attached servers (222, 224, 226) and the enclosure (202) to perform memory access operations in which the enclosure attached servers (222, 224, 226) access memory contained in the enclosure (202).

The enclosure (202) of FIG. 2 may also include computer logic that includes computer program instructions executed by computer hardware. The computer logic contained in the enclosure (202) may also include computer memory. The computer logic contained in the enclosure (202) may be embodied, for example, as a combination of one or more computing elements including a field-programmable gate array ('FPGA'), application specific integrated circuit ('ASIC'), a computer processor, computer memory, and so on. The computer logic contained in the enclosure (202) may be configured to carry out the steps described below.

The example method of FIG. 2 includes identifying (204), by an enclosure (202), a first enclosure attached server (222) that is not meeting a first predetermined performance threshold. In the example method of FIG. 2, the first predetermined performance threshold may include information specifying a number of requests to service in a predetermined period of time, an average response time for performing various operations, and so on. Identifying (204) a first enclosure attached server (222) that is not meeting a first predetermined performance threshold may be carried out, for example, by the enclosure (202) querying each enclosure attached server (222, 224, 226) for performance information, receiving such performance information from each enclosure attached server (222, 224, 226), and comparing the performance information from each enclosure attached server (222, 224, 226) to predetermined performance thresholds for enclosure attached server (222, 224, 226). If a particular enclosure attached server (222, 224, 226) is not meeting its predetermined performance threshold, the enclosure attached server (222, 224, 226) may be identified (204) as an enclosure attached server (222, 224, 226) that is not meeting its predetermined performance threshold. In the example described in FIG. 2, assume that enclosure attached server (222) has been identified (204) as being a first enclosure attached server (222) that is not meeting a first predetermined performance threshold.

The example method of FIG. 2 also includes identifying (206), by the enclosure (202), a second enclosure attached server (224) that is meeting a second predetermined performance threshold. In the example method of FIG. 2, the second predetermined performance threshold may include information specifying a number of requests to service in a predetermined period of time, an average response time for performing various operations, and so on. Identifying (206) a second enclosure attached server (224) that is meeting a second predetermined performance threshold may be carried out, for example, by the enclosure (202) querying each enclosure attached server (222, 224, 226) for performance information, receiving such performance information from each enclosure attached server (222, 224, 226), and comparing the performance information from each enclosure attached server (222, 224, 226) to predetermined performance thresholds for enclosure attached server (222, 224, 226). If a particular enclosure attached server (222, 224, 226) is meeting its predetermined performance threshold, the enclosure attached server (222, 224, 226) may be identified (206) as an enclosure attached server (222, 224, 226) that is meeting its predetermined performance threshold. In the example described in FIG. 2, assume that enclosure attached server (224) has been identified (206) as being a second enclosure attached server (224) that is meeting a second predetermined performance threshold.

The example method of FIG. 2 also includes blocking (208), by the enclosure (202), access to a predetermined amount of cache (230) on the second enclosure attached server (224) by the second enclosure attached server (224). In the example method of FIG. 2, the predetermined amount of cache (230) on the second enclosure attached server (224) may be specified as a predetermined percentage of the entire cache (230) on the second enclosure attached server (224), as a predetermined amount of memory, and so on. Blocking (208) access to a predetermined amount of cache (230) on the second enclosure attached server (224) may be carried out, for example, by the enclosure (202) sending an instruction to the second enclosure attached server (224) that identifies a portion of the cache (230) on the second enclosure attached server (224) that the second enclosure attached server (224) should avoid utilizing. In such an example, the second enclosure attached server (224) can effectively set aside a portion of its cache (230) for possible use by the first enclosure attached server (222) that is not meeting a first predetermined performance threshold. Prior to actually allowing the first enclosure attached server (222) to utilize the predetermined amount of cache (230) on the second enclosure attached server (224), however, the enclosure (202) can block (208) the second enclosure attached server (224) from accessing the predetermined amount of cache (230) on the second enclosure attached server (224) to determine the performance impact to the second enclosure attached server (224).

In the example method of FIG. 2, blocking (208) access to a predetermined amount of cache (230) on the second enclosure attached server (224) by the second enclosure attached server (224) can include identifying (209) the least frequently used portions of the cache (230) on the second enclosure attached server (224). In the example method of FIG. 2, each enclosure attached server (222, 224, 226) that includes local cache (228, 230, 232) can retain information identifying how frequently an entry in the cache (228, 230, 232) is accessed.

Such information can be a simple date stamp identifying the last time that an entry in the cache (228, 230, 232), a counter identifying the number of times that an entry in the cache (228, 230, 232) was accessed, and so on. In such an example, entries in the cache (228, 230, 232) that are used less frequently may be ideal candidates for lending to another enclosure attached server (222, 224, 226). Blocking (208) access to a predetermined amount of cache (230) on the second enclosure attached server (224) by the second enclosure attached server (224) can therefore include identifying (209) the least frequently used portions of the cache (230) on the second enclosure attached server (224) and selecting the least frequently used portions of the cache (230) on the second enclosure attached server (224) to be blocked (208) from being accessed by the second enclosure attached server (224).

The example method of FIG. 2 also includes determining (210), by the enclosure (202), whether the second enclosure attached server (224) is meeting the second predetermined performance threshold. In the example method of FIG. 2, determining (210) whether the second enclosure attached server (224) is meeting the second predetermined performance threshold may be carried out after access to the predetermined amount of cache (230) on the second enclosure attached server (224) has been blocked (208). In such a way, the performance impact associated with reducing the size of the cache (230) that may be utilized by the second enclosure attached server (224) can be determined before actually lending some portion of the cache (230) on the second enclosure attached server (224) to another enclosure attached server (222, 226).

In the example method of FIG. 2, determining (210) whether the second enclosure attached server (224) is meeting the second predetermined performance threshold may be carried out, for example, by the enclosure (202) querying the second enclosure attached server (224) for performance information, receiving such performance information from the second enclosure attached server (224), and comparing the performance information to the second predetermined performance threshold. If the second enclosure attached server (224) is still meeting the second predetermined performance threshold after access to the predetermined amount of cache (230) has been blocked (208), the second enclosure attached server (224) can safely lend the predetermined amount of cache (230) to another enclosure attached server (222, 226) and still meet its performance requirements. If the second enclosure attached server (224) is not meeting the second predetermined performance threshold after access to the predetermined amount of cache (230) has been blocked (208), however, the second enclosure attached server (224) cannot lend the predetermined amount of cache (230) to another enclosure attached server (222, 226) and still meet its performance requirements.

The example method of FIG. 2 also includes lending (216), by the enclosure (202), the predetermined amount of cache (230) on the second enclosure attached server (224) to the first enclosure attached server (222). In the example method of FIG. 2, lending (216), by the enclosure (202), the predetermined amount of cache (230) on the second enclosure attached server (224) to the first enclosure attached server (222) is carried out in response to affirmatively (212) determining that the second enclosure attached server (224) that is meeting the second predetermined performance threshold. In the example method of FIG. 2, the enclosure (202) lends (216) the predetermined amount of cache (230) on the second enclosure attached server (224) to the first enclosure attached server (222) in the sense that the first enclosure attached server (222) will access the predetermined amount of cache (230) on the second enclosure attached server (224) through the enclosure (202)—not through direct communication with the second enclosure attached server (224).

In the example method of FIG. 2, the enclosure (202) can lend (216) the predetermined amount of cache (230) on the second enclosure attached server (224) to the first enclosure attached server (222), for example, by servicing memory access requests initiated by the first enclosure attached server (222) that do not result in a cache hit on local cache in the first enclosure attached server (222). In the example method of FIG. 2, processing logic such as a computer processor within the first enclosure attached server (222) may generate a request to access computer memory. The first enclosure attached server (222) may initially attempt to service the request to access computer memory by searching any local cache (228) that is included in the first enclosure attached server (222). If the request to access computer memory cannot be serviced using cache (228) that is included in the first enclosure attached server (222), the first enclosure attached server (222) can send the request to access computer memory to the enclosure (202) over the data communications link (220).

Upon receipt of the request to access computer memory, the enclosure (202) may forward the request to a cache controller that resides on the second enclosure attached server (224). The cache controller may subsequently determine whether the request can be serviced using the predetermined amount of cache (230) on the second enclosure attached server (224) that has been lent to the first enclosure attached server (222). The cache controller can manage the predetermined amount of cache (230) on the second enclosure attached server (224) as if it were its own distinct cache, including replacing entries in the predetermined amount of cache (230) on the second enclosure attached server (224) according to a predetermined replacement policy. In such a way, the predetermined amount of cache (230) on the second enclosure attached server (224) can be utilized by the first enclosure attached server (222) as if it were local cache on the first enclosure attached server (222).

The example method of FIG. 2 also includes restoring (218), by the enclosure (202), access to the predetermined amount of cache (230) on the second enclosure attached server (224) by the second enclosure attached server (224). In the example method of FIG. 2, restoring (218) access to the predetermined amount of cache (230) on the second enclosure attached server (224) by the second enclosure attached server (224) is carried out in response to determining that the second enclosure attached server (224) is not (214) meeting the second predetermined performance threshold. Restoring (218) access to the predetermined amount of cache (230) on the second enclosure attached server (224) by the second enclosure attached server (224) may be carried out, for example, by the enclosure (202) sending an instruction to the second enclosure attached server (224) that identifies a portion of the cache (230) on the second enclosure attached server (224) that the second enclosure attached server (224) may now utilize. Prior to actually allowing the second enclosure attached server (224) to utilize the predetermined amount of cache (230) on the second enclosure attached server (224), however, the enclosure (202) can block the first enclosure attached server (222) from accessing the predetermined amount of cache (230) on the second enclosure attached server (224).

Figure 3:
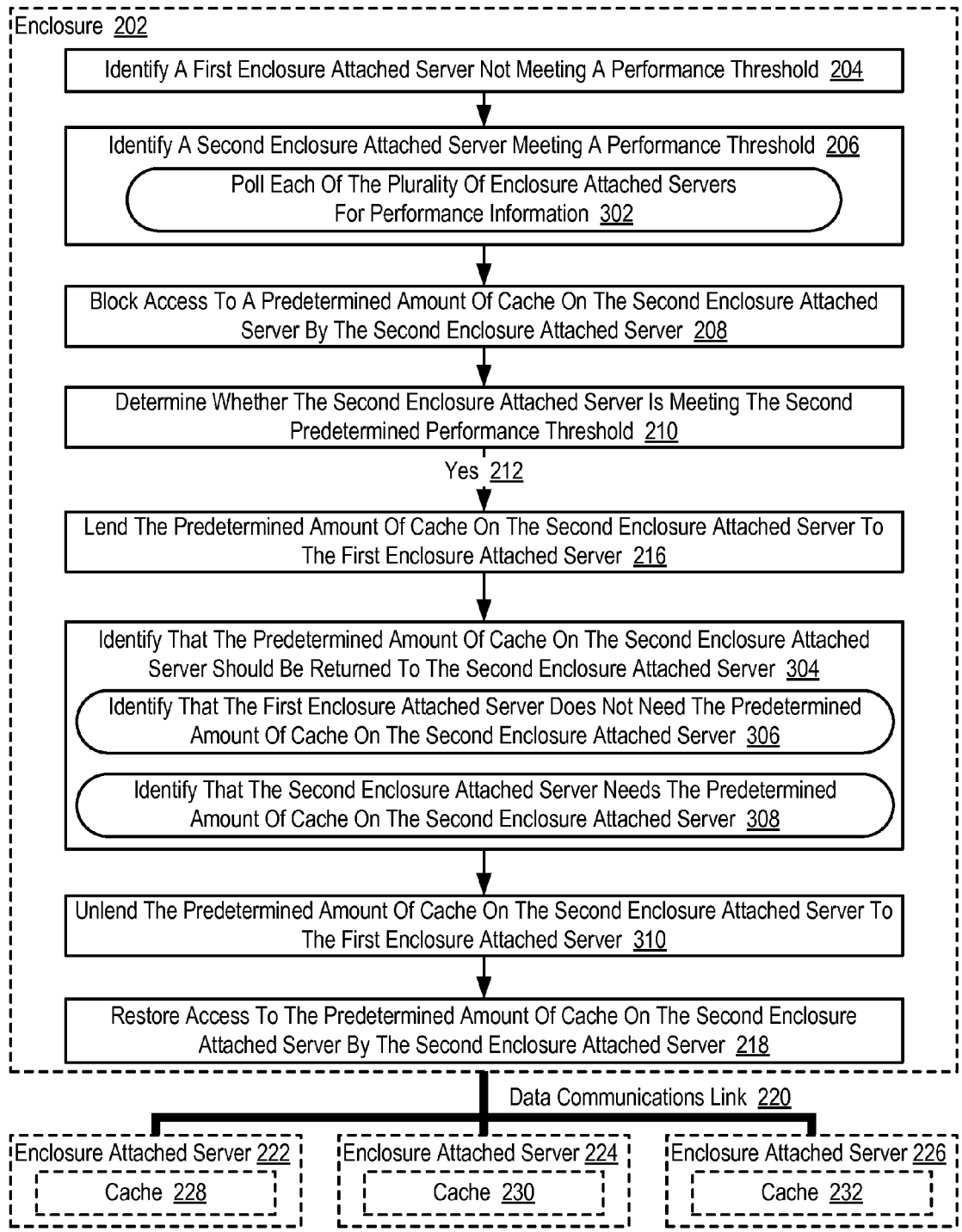
FIG. 3 sets forth a flow chart illustrating a further example method for sharing cache in a computing system that includes a plurality of enclosure attached servers according to embodiments of the present invention.

For further explanation, FIG. 3 sets forth a flow chart illustrating a further example method for sharing cache in a computing system that includes a plurality of enclosure attached servers (222, 224, 226) according to embodiments of the present invention. The example method of FIG. 3 is similar to the example method of FIG. 2 as it also includes identifying (204) a first enclosure attached server (222) that is not meeting a first predetermined performance threshold, identifying (206) a second enclosure attached server (224) that is meeting a second predetermined performance threshold, blocking (208) access to a predetermined amount of cache (230) on the second enclosure attached server (224) by the second enclosure attached server (224), determining (210) whether the second enclosure attached server (224) is meeting the second predetermined performance threshold, and lending (216) the predetermined amount of cache (230) on the second enclosure attached server (224) to the first enclosure attached server (222).

In the example method of FIG. 3, identifying (206) a second enclosure attached server (224) that is meeting a second predetermined performance threshold can include polling (302), by the enclosure (202), each of the plurality of enclosure attached servers (224, 226) for performance information. In the example method of FIG. 3, polling (302) each of the plurality of enclosure attached servers (224, 226) for performance information may be carried out by the enclosure (202) sending a message to each of the enclosure attached servers (224, 226) that may be candidates to lend cache to the first enclosure attached server (222). The message may include, for example, information identifying which performance information or metrics requested by the enclosure (202).

The example method of FIG. 3 also includes identifying (304), by the enclosure (202), that the predetermined amount of cache (230) on the second enclosure attached server (230) should be returned to the second enclosure attached server (230). In the example method of FIG. 3, identifying (304) that the predetermined amount of cache (230) on the second enclosure attached server (230) should be returned to the second enclosure attached server (230) may include identifying (306), by the enclosure (202), that the first enclosure attached server (222) does not need the predetermined amount of cache (230) on the second enclosure attached server (224).

In the example method of FIG. 3, identifying (306) that the first enclosure attached server (222) does not need the predetermined amount of cache (230) on the second enclosure attached server (224) may be carried out, for example, by the enclosure (202) monitoring the workload of the first enclosure attached server (222). In such an example, when the workload drops by a predetermined percentage, the enclosure (202) may determine that the first enclosure attached server (222) no longer needs the predetermined amount of cache (230) on the second enclosure attached server (224) to meet its performance requirements.

In the example method of FIG. 3, identifying (306) that the first enclosure attached server (222) does not need the predetermined amount of cache (230) on the second enclosure attached server (224) may alternatively be carried out, for example, by the enclosure (202) gradually preventing the first enclosure attached server (222) from accessing the predetermined amount of cache (230) on the second enclosure attached server (224). In such an example, the enclosure (202) can monitor the performance of the first enclosure attached server (222) as the enclosure (202) incrementally prevents the first enclosure attached server (222) from accessing the predetermined amount of cache (230) on the second enclosure attached server (224). In such a way, the enclosure (222) can determine whether the first enclosure attached server (222) can meet its performance requirements as portions of the predetermined amount of cache (230) on the second enclosure attached server (224) become unavailable for use by the first enclosure attached server (222) and are returned for use by the second enclosure attached server (224).

In the example method of FIG. 3, identifying (304) that the predetermined amount of cache (230) on the second enclosure attached server (230) should be returned to the second enclosure attached server (230) may alternatively include identifying (308), by the enclosure (202), that the second enclosure attached server (224) needs the predetermined amount of cache (230) on the second enclosure attached server (224). In the example method of FIG. 3, identifying (308) that the second enclosure attached server (224) needs the predetermined amount of cache (230) on the second enclosure attached server (224) may be carried out, for example, by monitoring performance metrics associated with the second enclosure attached server (224) and determining that the second enclosure attached server (224) is not meeting its performance requirements. In such an example, when the second enclosure attached server (224) is not performing as required, the enclosure (202) may identify (308) that the second enclosure attached server (224) needs the predetermined amount of cache (230) on the second enclosure attached server (224).

The example method of FIG. 3 also includes unlending (310), by the enclosure (202), the predetermined amount of cache (230) on the second enclosure attached server (224) to the first enclosure attached server (222). Unlending (310) the predetermined amount of cache (230) on the second enclosure attached server (224) to the first enclosure attached server (222) may be carried out, for example, by the enclosure (202) sending an instruction to the first enclosure attached server (222) that identifies an address range associated with the predetermined amount of cache (230) that the first enclosure attached server (222) should cease utilizing. In such an example, when a request to access computer memory results in a cache miss of local cache on the first enclosure attached server (222), the enclosure (202) will no longer forward such a request to access computer memory to the second enclosure attached server (224) for servicing by cache on the second enclosure attached server (224). The example method of FIG. 3 also includes restoring (218), by the enclosure (202), access to the predetermined amount of cache (230) on the second enclosure attached server (224) by the second enclosure attached server (224). In the example method of FIG. 3, restoring (218) access to the predetermined amount of cache (230) on the second enclosure attached server (224) by the second enclosure attached server (224) is carried out in response to determining that the second enclosure attached server (224) is not (214) meeting the second predetermined performance threshold. Restoring (218) access to the predetermined amount of cache (230) on the second enclosure attached server (224) by the second enclosure attached server (224) may be carried out, for example, by the enclosure (202) sending an instruction to the second enclosure attached server (224) that identifies a portion of the cache (230) on the second enclosure attached server (224) that the second enclosure attached server (224) may now utilize. Prior to actually allowing the second enclosure attached server (224) to utilize the predetermined amount of cache (230) on the second enclosure attached server (224), however, the enclosure (202) can block the first enclosure attached server (222) from accessing the predetermined amount of cache (230) on the second enclosure attached server (224).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An apparatus comprising a computer processor and a computer memory operatively coupled to the computer processor, the computer memory having disposed within it computer program instructions that, when executed by the computer processor, cause the apparatus to carry out the steps of:
   identifying a first server that is not meeting a first predetermined performance threshold;
   identifying a second server that is meeting a second predetermined performance threshold, wherein identifying the second server that is meeting the second predetermined performance threshold comprises:
      querying a plurality of servers for performance information,
      receiving performance information from each of the plurality of servers, and comparing the performance information from each of the plurality of servers to predetermined performance thresholds for each of the plurality of servers;

blocking access to a predetermined amount of cache on the second server by the second server;

determining after blocking access by the second server to the predetermined amount of cache on the second server, whether the second server is meeting the second predetermined performance threshold;

responsive to determining that the second server is meeting the second predetermined performance threshold, lending the predetermined amount of cache on the second server to the first server.

2. The apparatus of claim 1 further comprising computer program instructions that, when executed by the computer processor, cause the apparatus to carry out the step of, responsive to determining that the second server is not meeting the second predetermined performance threshold, restoring, by the enclosure, access to the predetermined amount of cache on the second enclosure attached server by the second enclosure attached server.

3. The apparatus of claim 1 wherein blocking access to the predetermined amount of cache on the second server by the second server further comprises identifying the least frequently used portions of the cache on the second server.

4. The apparatus of claim 1 further comprising computer program instructions that, when executed by the computer processor, cause the apparatus to carry out the steps of:
identifying that the predetermined amount of cache on the second server should be returned to the second server;
unlending the predetermined amount of cache on the second server to the first server; and
restoring access to the predetermined amount of cache on the second server by the second server.

5. The apparatus of claim 4 wherein identifying that the predetermined amount of cache on the second server should be returned to the second server further comprises identifying that the first server does not need the predetermined amount of cache on the second server.

6. The apparatus of claim 4 wherein identifying that the predetermined amount of cache on the second server should be returned to the second server further comprises identifying that the second server needs the predetermined amount of cache on the second server.

7. The apparatus of claim 1 wherein identifying the second server that is meeting a second predetermined performance threshold further comprises polling each of the plurality of servers for performance information.

8. The apparatus of claim 1, wherein the first server and the second server do not use the predetermined amount of cache on the second server during the blocking.

9. The apparatus of claim 1 further comprising computer program instructions that, when executed by the computer processor, cause the apparatus to carry out the step of accessing, by the first server, the predetermined amount of cache on the second server indirectly via an enclosure.

10. A computer program product including a non-transitory computer readable medium, the computer program product comprising computer program instructions that, when executed, cause a computer to carry out the steps of:
identifying a first server that is not meeting a first predetermined performance threshold;
identifying a second server that is meeting a second predetermined performance threshold, wherein identifying the second server that is meeting the second predetermined performance threshold comprises:
querying a plurality of servers for performance information,
receiving performance information from each of the plurality of servers, and
comparing the performance information from each of the plurality of servers to predetermined performance thresholds for each of the plurality of servers;
blocking access to a predetermined amount of cache on the second server by the second server;
determining after blocking access by the second server to the predetermined amount of cache on the second server, whether the second server is meeting the second predetermined performance threshold;
responsive to determining that the second server is meeting the second predetermined performance threshold, lending the predetermined amount of cache on the second server to the first server.

11. The computer program product of claim 10 further comprising computer program instructions that, when executed, cause the computer to carry out the step of, responsive to determining that the second server is not meeting the second predetermined performance threshold, restoring access to the predetermined amount of cache on the second server by the second server.

12. The computer program product of claim 10 wherein blocking access to the predetermined amount of cache on the second server by the second server further comprises identifying the least frequently used portions of the cache on the second server.

13. The computer program product of claim 10 further comprising computer program instructions that, when executed, cause the computer to carry out the steps of:
identifying that the predetermined amount of cache on the second server should be returned to the second server;
unlending the predetermined amount of cache on the second server to the first server; and
restoring access to the predetermined amount of cache on the second server by the second server.

14. The computer program product of claim 13 wherein identifying that the predetermined amount of cache on the second server should be returned to the second server further comprises identifying that the first server does not need the predetermined amount of cache on the second server.

15. The computer program product of claim 13 wherein identifying that the predetermined amount of cache on the second server should be returned to the second server further comprises identifying that the second server needs the predetermined amount of cache on the second server.

16. The computer program product of claim 10, wherein the first server and the second server do not use the predetermined amount of cache on the second server during the blocking.

17. The computer program product of claim 10 further comprising computer program instructions that, when executed, cause the computer to carry out the step of accessing, by the first server, the predetermined amount of cache on the second server indirectly via an enclosure.

* * * * *